Patented Nov. 17, 1942

2,302,103

UNITED STATES PATENT OFFICE 2,302,103

CHEMICAL PROCESSES AND PRODUCTS

Fred C. Carlson, University Heights, and Robert Pfanstiel, Lakewood, Ohio, assignors to E. I. du Pont de Nemours & Company, Wilmington, Del., a corporation of Delaware No Drawing. Application March 5, 1940, Serial No. 322,336

9 Claims. (Cl. 167—16)

This invention relates to stabilized double salts of copper oxide and calcium chloride and to processes for producing them. The invention is more particularly directed to processes in which calcium tetracuproxy chlorides are made stable in water by mixing with the calcium tetracuproxy chlorides a small amount of a stabilizing agent capable of producing a low concentration of copper ions in the presence of the calcium tetracuproxy chloride and water, the stabilizing agent being selected from the group consisting of glucose, gum tragacanth, sulfite cellulose waste, gum arabic, cupric chloride, cupric sulfate, cupric acetate, cupric nitrate, sodium phosphate, potassium phosphate, and ammonium phosphate. The invention is further directed to the stabilized calcium tetracuproxy chloride compositions so produced.

Various complex compounds of copper oxide and calcium chloride have been recognized to have valuable fungicidal properties. The manufacture and fungicidal use of a compound reported to have the formula $3CuO \cdot CaCl_2 \cdot xH_2O$ is described in United States Patent 1,362,172 granted to Morselli, but this compound does not appear to have been in general use as a commercial fungicide. More recently, in British Patent 425,395 granted to Souviron et al., there has been described the manufacture and fungicidal use of a composition stated to have the empirical formula $4Cu(OH)_2 \cdot CaCl_2 \cdot 4H_2O$. For convenience of reference, compounds of this type having as constituents copper oxide or copper hydroxide and calcium chloride in such proportions that the atomic ratio of copper to calcium is 4:1, will hereinafter be designated as "calcium tetracuproxy chlorides" although by such a designation a particular structural formula for these compounds is not meant to be ascribed nor is a particular degree of hydration designated.

Despite their outstanding merit as fungicides, calcium tetracuproxy chlorides suffer from the disadvantage that they are somewhat unstable in water. This lack of stability is particularly noticeable at elevated temperatures so that in the manufacture of calcium tetracuproxy chlorides excessive heating of the product must be avoided with the result that the achievement of a satisfactory drying rate is sometimes difficult.

The instability of calcium tetracuproxy chlorides in water is manifest by a tendency of the compounds to acquire a dark color, their normal dark blue color changing more or less rapidly to dark grey and black. This change of color is usually accompanied by a flocculation of the product, the agglomerated particles being larger than is desirable for a fungicide.

Now we have found that water-stable compositions may be produced by mixing with calcium tetracuproxy chlorides a small amount of a stabilizing agent capable of producing a low concentration of copper ions in the presence of the calcium tetracuproxy chlorides and water, the stabilizing agent being selected from the group consisting of glucose, gum tragacanth, sulfite cellulose waste, gum arabic, cupric chloride, cupric sulfate, cupric acetate, cupric nitrate, sodium phosphate, potassium phosphate, and ammonium phosphate.

When water dispersions are made using the stabilized calcium tetracuproxy chlorides of our invention, the copper compounds do not exhibit their hitherto observed tendency to decompose upon standing. On the contrary, such dispersions may be permitted to stand for long periods without decomposition. The importance of this improved property of the stabilized compositions will be readily appreciated when it is understood that aqueous dispersions of copper fungicides are frequently permitted to stand for periods of several hours in the course of their application to foliage and vegetation.

The lack of tendency toward decomposition shown by our novel stabilized compositions is also advantageous in that it facilitates the drying of aqueous dispersions of calcium tetracuproxy chlorides during manufacture. In the methods heretofore available for making calcium tetracuproxy chlorides, the product has been obtained as a precipitate in an aqueous medium. It has been the practice to filter off this precipitate, wash it, and dry the filter-press cake. Various methods may be used for accomplishing this result, such as drum drying, spray drying or oven drying. In each of these methods the calcium tetracuproxy chlorides are necessarily heated to elevated temperatures in the presence of water. It has heretofore been necessary carefully to control the temperature attained in the drying operation since the decomposition of calcium tetracuproxy chlorides in the presence of water is greatly accelerated as the temperature is increased. When a stabilizing agent is mixed with the calcium tetracuproxy chlorides before drying, in accordance with a process of our invention, the drying may be carried out at higher temperatures without decomposition.

The nature of our novel stabilized compositions containing calcium tetracuproxy chlorides and the manner of their preparation may most easily be understood by reference to an illustrative example, although our invention is not to be construed as limited by the specific embodiments hereinafter shown for the purposes of illustration.

Example

An aqueous dispersion of a stabilized composition of our invention was made up by mixing 30 parts by weight of a calcium tetracuproxy chloride having the empirical formula

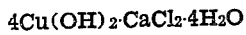

with 0.6 part by weight of the stabilizing agent, sulfite cellulose waste, and agitating this mixture with 70 parts by weight of water. The dispersion was then heated to 90° C. and maintained at this temperature, the dispersion being constantly agitated and the original volume being maintained by the addition of water when necessary.

It was observed that even after 2.5 hours of such heating the color of the calcium tetracuproxy chloride was unchanged. In contrast to this observed stability in the presence of a stabilizing agent a dispersion of equal concentration made up with calcium tetracuproxy chloride containing no stabilizing agent was noted to have changed color from the characteristic blue of the calcium tetracuproxy chloride to a very dark grey, indicating that decomposition had occurred. This observation was confirmed by filtering off the product from each of the samples and analyzing the filtrates. It was found that the filtrate from the sample containing no stabilizing agent contained amounts of chloride ions several times as great as the filtrate from the sample containing the stabilizing agent.

By procedures duplicating those of the foregoing example, numerous agents were mixed with calcium tetracuproxy chloride and the resulting compositions were shown to be stable in the presence of water. Agents which were found to be of outstanding value were the following: Glucose, gum tragacanth, gum arabic, cupric chloride, cupric sulfate, cupric acetate, cupric nitrate, sodium phosphate, potassium phosphate, and ammonium phosphate. As sodium phosphates there was used the orthophosphates, that is, mono, di and trisodium phosphate, and molecularly dehydrated phosphates such as sodium pyrophosphate and sodium metaphosphate.

Various explanations might be advanced to account for the action of the above enumerated stabilizing agents. A common characteristic seems to be an ability of these agents when present in minor amounts to produce a low concentration of copper ions in the presence of calcium tetracuproxy chloride and water. Certain of the agents, such as cupric chloride, which are very soluble in water and which ionize almost completely would give large concentrations of copper ions if used in large amounts, and in such cases we have found that it is preferable to use a quantity of the stabilizing agents as will give only a small concentration of copper ions when the mixture of the stabilizing agent and calcium tetracuproxy chloride is dispersed in water.

Certain of the stabilizing agents which we have found suitable for producing small concentrations of copper ions are hydrophilic colloids, and as such have a further stabilizing effect which appears to be in the nature of a protective action derived from their colloidal properties. The stabilizing agents which have this further characteristic of functioning as protective colloids include glucose, gum tragacanth, sulfite cellulose waste, and gum arabic.

The amount of a stabilizing agent which we may use in the stabilized calcium tetracuproxy chloride compositions of our invention may be considerably varied. It has already been pointed out above that when inorganic copper salts such as cupric chloride, cupric sulfate, or cupric acetate are used, the concentrations of copper ions produced are high relative to the amounts of the copper salts present, and hence very small amounts of such salts will ordinarily suffice. When hydrophilic protective colloids are used as stabilizing agents, on the other hand, the amounts which can be employed are somewhat larger. We have found that more than about two per cent of the stabilizing agent based on the weight of calcium tetracuproxy chloride is ordinarily not required to give satisfactory stabilization in the presence of water.

While in the above description of our invention we have shown specific embodiments for the purposes of illustration, it will be understood that those skilled in the art, without departing from the scope of our invention, may employ various modifications for stabilizing calcium tetracuproxy chlorides.

We claim:

1. In a process for stabilizing calcium tetracuproxy chloride against dissociation by water and inhibiting the consequent formation of water-soluble copper upon drying a water dispersion thereof whereby the calcium tetracuproxy chloride may be applied to foliage without the injury characteristic of water-soluble copper compounds the step comprising mixing with the calcium tetracuproxy chloride a small amount of a stabilizing agent selected from the class consisting of glucose, gum tragacanth, sulfite cellulose waste, and gum arabic.

2. In a process for stabilizing calcium tetracuproxy chloride against dissociation by water and inhibiting the consequent formation of water-soluble copper upon drying of a water dispersion thereof whereby the calcium tetracuproxy chloride may be applied to foliage without the injury characteristic of water-soluble copper compounds the step of mixing with the tetracuproxy chloride an effective amount, but not substantially greater than about 2% by weight, of a stabilizing agent selected from the class consisting of glucose, gum tragacanth, sulfite cellulose waste, and gum arabic.

3. In a process for stabilizing calcium tetracuproxy chloride against dissociation by water and inhibiting the consequent formation of water-soluble copper upon drying of a water dispersion thereof whereby the calcium tetracuproxy chloride may be applied to foliage without the injury characteristic of water-soluble copper compounds the step of admixing therewith a small amount of sulfite cellulose waste.

4. In a process for stabilizing calcium tetracuproxy chloride against dissociation by water and inhibiting the consequent formation of water-soluble copper upon drying of a water dispersion thereof whereby the calcium tetracuproxy chloride may be applied to foliage without the injury characteristic of water-soluble copper compounds the step of admixing therewith sulfite cellulose waste in an amount sufficient to stabilize the calcium tetracuproxy chloride but not substantially in excess of 2% by weight.

5. A composition of matter consisting essentially of calcium tetracuproxy chloride admixed with a small amount of a stabilizing agent selected from the class consisting of glucose, gum tragacanth, sulfite cellulose waste, and gum arabic, said composition being characterized in that it may be applied to foliage without the injury characteristic of water-soluble copper compounds and by having greater stability than the calcium tetracuproxy chloride itself against decomposition upon drying from a water dispersion and therefore against the formation of sufficient amounts of water-soluble copper to be injurious to plants.

6. A composition of matter consisting essentially of calcium tetracuproxy chloride admixed with a small amount, up to about 2% by weight, of a stabilizing agent selected from the class consisting of glucose, gum tragacanth, sulfite cellulose waste and gum arabic, said composition being characterized in that it may be applied to foliage without the injury characteristic of water-soluble copper compounds and by having greater stability than the calcium tetracuproxy chloride itself against decomposition upon drying from a water dispersion and therefore against the formation of sufficient amounts of water-soluble copper to be injurious to plants.

7. A composition of matter consisting essentially of calcium tetracuproxy chloride admixed with a small amount of sulfite cellulose waste, said composition being characterized in that it may be applied to foliage without the injury characteristic of water-soluble copper compounds and by having greater stability than the calcium tetracuproxy chloride itself against decomposition upon drying from a water dispersion and therefore against the formation of sufficient amounts of water-soluble copper to be injurious to plants.

8. A composition of matter consisting essentially of calcium tetracuproxy chloride admixed with a small amount, up to about 2% by weight, of sulfite cellulose waste, said composition being characterized in that it may be applied to foliage without the injury characteristic of water-soluble copper compounds and by having greater stability than the calcium tetracuproxy chloride itself against decomposition upon drying from a water dispersion and therefore against the formation of sufficient amounts of water-soluble copper to be injurious to plants.

9. In a process for producing a calcium tetracuproxy chloride composition characterized in that it may be applied to foliage without the injury characteristic of water-soluble copper compounds and by having greater stability than calcium tetracuproxy chloride itself against decomposition upon drying from an aqueous dispersion and therefore against formation of sufficient amounts of water-soluble copper to be injurious to plants, the steps comprising precipitating calcium tetracuproxy chloride, admixing with the precipitate a small amount, up to about two percent by weight, of sulfite cellulose waste, and drying the resultant mixture.

FRED C. CARLSON.
ROBERT PFANSTIEL.